United States Patent [19]

Hosaka et al.

[11] 4,357,391
[45] Nov. 2, 1982

[54] MAGNETIC RECORDING MEDIUM

[75] Inventors: Akihiko Hosaka; Kiyotaka Okuyama, both of Saku, Japan

[73] Assignee: TDK Electronics Co., Ltd., Tokyo, Japan

[21] Appl. No.: 151,472

[22] Filed: May 19, 1980

[30] Foreign Application Priority Data

May 18, 1979 [JP] Japan .................................. 54/60386

[51] Int. Cl.³ .............................................. G11B 5/70
[52] U.S. Cl. .................. 428/413; 252/62.54; 360/134; 428/425.9; 428/694; 428/900
[58] Field of Search ............ 428/900, 694, 695, 425.9, 428/413, 520, 522; 427/128, 127; 252/62.54, 62.53; 360/134, 135, 136

[56] References Cited

U.S. PATENT DOCUMENTS

| 3,320,090 | 5/1967 | Graubart | 428/425.9 |
| 3,597,273 | 8/1971 | Akashi et al. | 252/62.54 |
| 3,740,266 | 6/1973 | Akashi et al. | 252/62.54 |
| 3,810,840 | 5/1974 | Ruler | 252/62.54 |
| 3,840,400 | 10/1974 | Yamada et al. | 428/413 |
| 3,911,196 | 10/1975 | Navidad | 428/425.9 |
| 4,115,290 | 9/1978 | Kubota et al. | 252/62.54 |
| 4,186,228 | 1/1980 | Ogawa et al. | 428/694 |
| 4,238,548 | 12/1980 | Okuyama et al. | 428/900 |
| 4,323,628 | 4/1982 | Okuyama et al. | 428/425.9 |

FOREIGN PATENT DOCUMENTS

| 51-44903 | 4/1976 | Japan | 427/128 |
| 54-1004 | of 1979 | Japan | 428/900 |
| 54-29085 | of 1979 | Japan | 427/128 |
| 650099 | of 1979 | U.S.S.R. | 428/900 |

Primary Examiner—Stanley S. Silverman
Attorney, Agent, or Firm—Wyatt, Gerber, Shoup, Scobey & Badie

[57] ABSTRACT

A magnetic recording medium is provided which satisfies electromagnetic conversion characteristics and typical physical properties such as bonding strength, repeated-passage stability, still-playback characteristics, etc. without unfavorably affecting the surface smoothness. The binder in the magnetic coating contains in combination specific proportions of three components, a polyurethane resin, an epoxy resin, and a nitrocellulose whose protective ingredient has been replaced by a vinyl chloride-vinyl acetate copolymer is used as a resin binder in magnetic coating material together with a polyisocyanate curing agent.

7 Claims, 1 Drawing Figure

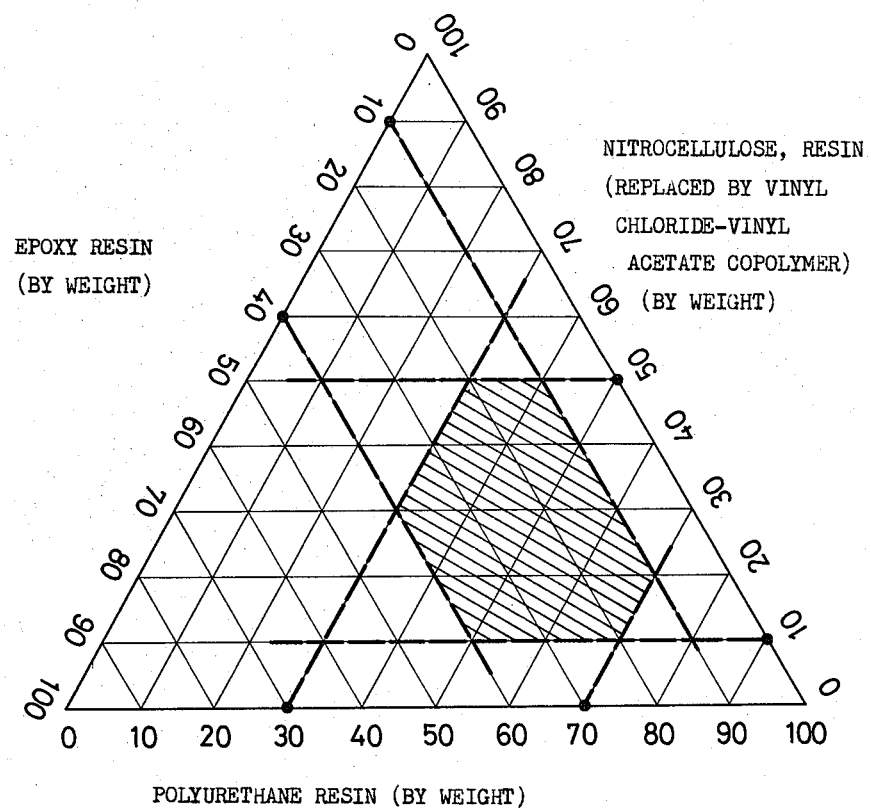

MAGNETIC RECORDING MEDIUM

BACKGROUND OF THE INVENTION

1. Field of the Invention

This invention relates to a magnetic recording medium. More particularly, the invention is concerned with a magnetic recording medium which satisfies electromagnetic conversion characteristics and typical physical requirements such as bonding strength, repeated-passage stability, still-playback characteristics, etc. without unfavorably affecting the smoothness on the surface.

2. Description of the Prior Art

The magnetic recording medium in common use today comprises a resin film or similar base material coated with a magnetic coating material comprising a mixture of a magnetic powder and a resin binder. Endeavors have been made in the art provide a magnetic recording medium much improved in characteristics. In particular, a variety of resin binders have been proposed for use in preparing magnetic coatings. The binders thus far most often employed have consisted of two-component combinations of urethane, vinyl cloride-vinyl acetate, cellulose, epoxy, ethylene, and ester resins. Those binary binders have, however, had a disadvantage in that, in the choice of the mixing ratio of the two components, electromagnetic conversion characteristics and physical properties such as repeated-passage stability and bonding strength required for the recording medium are antagonistic to each other. It is extremely difficult to select a binder with the correct component ratio to satisfy both requirements.

Nitrocellulose, proposed as a resin binder, has been widely employed because of the good wettability it confers on the magnetic powder and also for good leveling of the resulting coating. However, the high flammability inherent in nitrocellulose necessitates its careful handling at all times to provide protection against fire and explosion hazards. In order to secure safety in storage and in handling, the law obliges the supplier to impregnate nitrocellulose with isopropyl alcohol as a protective ingredient, in an amount from 30 to 35% of the weight of the ester, to protect against fire and explosion. On the other hand, when nitrocellulose is combined with a polyurethane compound or the like, nonnitrated hydroxyl groups in the cellulose chain will undergo cross-linking with isocyanate radicals in the urethane compound. In the application of nitrocellulose as a resin binder for magnetic coating material, the mechanical strength that stems from this cross-linking as well as the good affinity of nitrocellulose to magnetic coating material proves very helpful in improving electromagnetic conversion characteristics and physical properties required of the magnetic tape. However, before the reaction with the isocyanate radical of the urethane compound is taken advantage of, the hydroxyl group in the isopropyl alcohol with which the nitrocellulose is impregnated will react first with the isocyanate radical of the urethane compound added to effect the cross-linking with the nitrocellulose, thus reducing the degree of cross-linking and lessening the effect of improving the physical properties of the product. In an attempt to correct this drawback, it has been proposed to replace the isopropyl alcohol used for impregnation as a protective ingredient, by dibutyl terephthalate, dioctyl phthalate, or other similar plasticizer. The replacement is still disadvantageous because the plasticizer weakens the coating, rendering it difficult for the coating to have satisfactory physical properties. It is well-known in this connection that nitrocellulose offers as its physical features improved wear resistance and running stability but also has a disadvantage of low bonding strength.

SUMMARY OF THE INVENTION

It has now been found that, if three components, i.e., a polyurethane resin, an epoxy resin, and a nitrocellulose whose protective ingredient has been replaced by a vinyl chloride-vinyl acetate copolymer, are combined and compounded in a certain mixing ratio, both characteristic requirements can be satisfied. The resulting magnetic recording medium is superior in characteristics to the conventional ones using the ordinary two-component binders. Moreover, the afore-described disadvantages inherent in the nitrocellulose currently in use are avoided.

DETAILED DESCRIPTION OF THE INVENTION

Briefly, the present invention provides a magnetic recording medium made by coating a base material with a magnetic coating material, the binder composition in the magnetic coating material being a ternary system containing from 30 to 70% of a polyurethane resin, from 10 to 40% of an epoxy resin, and from 10 to 50% of a nitrocellulose whose protective ingredient has been replaced by a vinyl chloride-vinyl acetate copolymer, all by weight. Thus, according to the present invention, a generally excellent magnetic recording medium is provided which satisfies the requirement for electromagnetic conversion characteristics, a property of prime importance for a magnetic recording medium without at the same time sacrificing physical properties, typically bonding strength, repeated-passage stability, still-playback characteristics, etc. and without the possibility of the loss of surface smoothness, a property usually antagonistic to the abovementioned characteristics. Further, in accordance with the invention, the antipodal physical problems of reduced bonding strength and weakening of the coating that usually results from the incorporation therein of nitrocellulose are both solved.

Under the invention, as described above, the binder composition in the magnetic coating material comprises three components, i.e., a polyurethane resin, an epoxy resin, and a replaced nitrocellulose resin i.e. a nitrocellulose free of isopropyl alcohol or plasticizer. Polyurethane resins usually are reaction products of diisocyanates with glycols or similar compounds containing hydroxyl groups. In the practice of this invention, many of commercially available polyurethane resins may be employed. Typical of those useful resins are the products of Nippon Polyurethane Industry Co. marketed under the trade designations "Nippollan 5032, 5033, and 2304" and the products of B. F. Goodrich Chemical Co. trademarked "Estane 5702 and 5703". Epoxy resins generally are condensation products of epoxy compounds with compounds containing reactive hydrogen atoms. For the purposes of the invention, the products of commerce, e.g., Shell Chemical Co.'s "Epikote 1004, 1007, and 1009" (all trademarks) may be used. The replaced nitrocellulose for use in the present invention is, for example, in the form of chips containing 70% nitrocellulose, prepared by replacing isopropyl alcohol, plasticizer or the like, with which the nitrocellulose is moistened, by a vinyl chloride-vinyl acetate copolymer (e.g., Union Carbide Corp.'s "VAGH").

For the present invention, the combination of these three resin components in specific proportions is an essential constituent factor. The accompanying figure shows a composition diagram of the three resin components for use as a resin in the present invention. According to the present invention, the proportions or percentages of the components come within the hatched region in the composition diagram of the drawing. Specifically, the polyurethane resin must be from 30–70%, the epoxy resin from 10–40%, and the vinyl chloride-vinyl acetate-replaced nitrocellulose from of 10–50%, all by weight.

Should any of the three components assume a proportion outside of its specified range, the resulting magnetic recording medium would have one of its essential characteristics affected adversely and would generally pose a problem in practical use. For example, if the proportion of the polyurethane resin falls short of 30%, the bonding strength of the resulting coating will tend to decrease. Conversely if it exceeds 70%, the bonding strength will sharply increase but the repeated-passage stability and still durability of the resulting medium will be impaired, and vibrations of the reproduced image or sticking of a coating layer to another on restarting after a stop will take place. When the epoxy resin accounts for less than 10% of the total weight, the coating material will become less dispersible, with consequent aggravation of the coating surface quality and deterioration of the electromagnetic conversion characteristics. On the other hand, when the epoxy resin amounts to more than 40%, the difference between the contraction coefficients of the base material and the coating will cause curling or warping of the resulting recording medium, with adverse effects upon the repeated-passage stability and still durability despite an improvement in the bonding strength of the medium. Further, if the proportion of the replaced nitrocellulose is below 10%, the bonding strength will increase but the repeated-passage stability and still durability will decrease. If the proportion is over 50%, the bonding strength will decrease and curling of the recording medium will accelerate the variation of the reproduction output.

The present invention contemplates the manufacture of a magnetic recording medium which possesses the properties desired as such by combining the three components in the specific proportions explained above to prepare a magnetic coating material which permits the binder to display its desirable properties to the full, and then applying the coating material to the base material. The magnetic recording tape thus manufactured is superior in both electromagnetic conversion characteristics and other properties.

The invention is illustrated by the following nonrestricting example.

EXAMPLE

Components, namely,

| | |
|---|---|
| $\gamma$-Fe$_2$O$_3$ (cobalt-doped) | 400 parts by weight |
| Polyurethane resin ("Nippollan 2304" marketed by Nippon Polyurethane Ind.) | 55 parts by weight |
| Epoxy resin (Epilote #1009" by Shell Chemical Co.) | 30 parts by weight |
| Nitrocellulose (chips "H-½" by Asahi Chemical Ind. Co., with 30% isopropyl alcohol replaced by 30% "VAGH", or UCC's vinyl chloride-vinyl acetate copolymer) | 15 parts by weight |
| Dispersant | 6 parts by weight |
| Lubricant | 5 parts by weight |
| Antistatic agent (carbon black) | 5 parts by weight |
| Methyl ethyl ketone | 500 parts by weight |
| Methyl isobutyl ketone | 250 parts by weight |
| Cyclohexanone | 200 parts by weight | were placed in a pigment dispersing machine and were thoroughly mixed and dispersed to prepare a magnetic coating material. Then, with the addition thereto of 15 parts by weight of a polyisocyanate as a curing agent ("Desmodur L" marketed by Sumitomo Bayer Urethane Co.), the whole mixture was mixed with agitation to form a homogeneous coating solution. The solution thus obtained was applied to a 15 $\mu$-thick polyester film to form a 6 $\mu$-thick coat thereon. After a surface finish by super calendering, the coating was cured by heating at 60° C. for 48 hours. The coated film was then cut into lengths of magnetic tape half an inch in width.

The video recording magnetic tape so obtained was tested for its various characteristics, including the bonding strength, repeated-passage stability, still durability, surface gloss, and electromagnetic conversion characteristics. The results or numerical values measured are given in the row "I" (test piece symbol) in Table 1.

Varied magnetic tapes were obtained in the same way except that the binder composition was modified, and similar tests were conducted on the test pieces. The measured values are given in the rows "A" to "H", "J", and "X" (test piece symbols). The binder compositions for "J" and "K" used a conventional nitrocellulose of commerce, impregnated with either 30% isopropyl alcohol or 18% dibutyl phthalate.

In Table 1 the expression "bonding strength" is used to mean the strength required to peel the magnetic coating and the base film 180° apart, in grams per ½ in. of width of the test tape. By "still duration" is meant the period of time required for attenuation by more than two decibels of the reproduction output for a stationary image. "Repeated-passage stability" denotes the number of times the tape is drawn past the head until vibrations of the image (jitter) take place. "Electromagnetic conversion characteristics" and "gloss" (as measured by a glossmeter "Model GH-5" made by Murakami Colors) are indicated as relative values based on the values of the test piece I which are both zero decibel (dB).

TABLE 1

| Test piece | Binder composition | | | | Properties | | | | |
| --- | --- | --- | --- | --- | --- | --- | --- | --- | --- |
| | Polyurethane | Epoxy | Replaced nitrocellulose | Nitrocellulose | Bond str. (g) | Repeated passage stability (No. of passes) | Still duration (min) | Gloss (dB) | Electromagnetic conversion characteristics 5 MHz (dB) |
| A | 20 | 20 | 60 | | 11 | 1100 | 55 | +0.3 | +0.3 |
| B | 60 | 10 | 30 | | 50 | 1250 | 50 | +0.1 | +0.2 |
| C | 40 | 40 | 20 | | 65 | 1150 | 50 | +0.1 | +0.3 |
| D | 50 | 45 | 5 | | 95 | 450 | 20 | −0.3 | −0.2 |
| E | 65 | 35 | — | | 145 | 200 | 10 | −1.5 | −2.0 |
| F | 35 | 65 | — | | 125 | 300 | 10 | −0.2 | −0.5 |
| G | 70 | — | 30 | | 70 | 450 | 15 | −0.8 | −0.9 |
| H | 40 | — | 60 | | 9 | 850 | 60 | −0.5 | −0.3 |
| I | 55 | 30 | 15 | | 55 | 1100 | 50 | 0 | 0 |
| J | 55 | 30 | | 15 | 43 | 650 | 35 | 0 | +0.1 |
| K | 55 | 30 | | 15 | 50 | 570 | 30 | +0.1 | −0.2 |

As can be seen from Table 1, the magnetic tapes of the test pieces "B", "C", and "I" that conform to this invention are excellent in properties and characteristics, such as bonding strength, repeated-passage stability, still durability, gloss and electromagnetic conversion characteristics. As a whole, they are tapes possessing well-balanced, outstanding properties. In contrast to them, the test pieces "A", "D" to "H", "J", and "K" collectively have some shortcomings and pose problems to be solved before practical use, although they prove superior in some point or other.

The amount of the curing agent added to the magnetic coating is preferably of from 5 to 20 parts by weight on the basis of the total weight of the binder. If the amount is less than 5 parts by weight, little crosslinking effect will be expected. Conversely if the amount is over 20 parts by weight, the strength of bonding to the base film will decrease and adhesion of the coating, layer to layer, will occur during the course of curing.

As described hereinbefore, the magnetic recording medium according to the invention is collectively superior in properties and characteristics to the conventional ones using ordinary binder systems.

What is claimed is:

1. A magnetic recording medium comprising a magnetic coating material coated on a base material, said coating material comprising powdered magnetic material dispersed in a ternary binder composition containing from 30 to 70% by weight of a polyurethane resin, from 10 to 40% by weight of an epoxy resin and from 10 to 50% by weight of replaced nitrocellulose, containing vinyl chloride-vinyl acetate copolymer, together with a polyisocyanate curing agent.

2. A magnetic recording medium of claim 1 in which the amount of vinyl chloride-vinyl acetate copolymer is 30% by weight based on the weight of nitrocellulose.

3. A magnetic recording medium of claim 1 containing from 5 to 20 parts by weight of polyisocyanate.

4. A magnetic recording medium of claim 1 wherein the binder contains 40% by weight of a polyurethane resin, 40% by weight of an epoxy resin and 20% by weight of replaced nitrocellulose.

5. A magnetic recording medium of claim 1 wherein the binder contains 55% by weight of a polyurethane resin, 30% by weight of an epoxy resin and 15% by weight of a replaced nitrocellulose.

6. A magnetic recording medium of claim 1 wherein the binder contains 60% by weight of a polyurethane resin, 10% by weight of an epoxy resin and 30% by weight of a replaced nitrocellulose.

7. A magnetic recording medium according to any one of claims 1-6 which is a video recording magnetic tape.

* * * * *